(12) United States Patent
Datta et al.

(10) Patent No.: US 8,948,454 B2
(45) Date of Patent: Feb. 3, 2015

(54) BOOSTING OBJECT DETECTION PERFORMANCE IN VIDEOS

(71) Applicant: International Business Machines Corporation, Armonk, NY (US)

(72) Inventors: Ankur Datta, White Plains, NY (US); Rogerio S. Feris, Hartford, CT (US); Sharathchandra U. Pankanti, Darien, CT (US); Yun Zhai, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 13/732,471

(22) Filed: Jan. 2, 2013

(65) Prior Publication Data
US 2014/0185925 A1 Jul. 3, 2014

(51) Int. Cl.
G06K 9/00 (2006.01)
G06K 9/34 (2006.01)

(52) U.S. Cl.
CPC .......................................... G06K 9/34 (2013.01)
USPC ............ 382/103; 382/173; 382/190; 382/195

(58) Field of Classification Search
USPC ......... 382/103, 173, 190, 194, 195, 199, 291, 382/203, 256
See application file for complete search history.

(56) References Cited

U.S. PATENT DOCUMENTS

2010/0259639 A1 10/2010 Hung et al.
2010/0290710 A1* 11/2010 Gagvani et al. ............... 382/224
2012/0033072 A1* 2/2012 Lin .............................. 348/143

OTHER PUBLICATIONS

Gabner et al., Semi-Supervised On-line Boosting for Robust Tracking, [online] 14 pages, Retrieved from the Internet: <URL: http://www.vision.ee.ethz.ch/~hegrabne/onlineBoosting/OnlineBoostingAndVisionCVPR2006Poster.pdf>.
Anonymous, Boosting Object Detection Performance in Crowded Surveillance Videos, Paper ID 141, WACV 2013 Submission, 6 pages.
Shai Avidan, Ensemble Tracking, 0-7695-2372-2/05 copyright 2005 IEEE, 8 pages.
Dalal, et al., Histograms of Oriented Gradients for Human Detection, [online] 8 pages, Retrieved from the Internet: <URL: http://lear.inrialpes.fr/people/triggs/pubs/Dalal-cvpr05.pdf>.

(Continued)

Primary Examiner — Brian Le
(74) Attorney, Agent, or Firm — Schmeiser, Olsen & Watts, LLP; William E. Schiesser

(57) ABSTRACT

A method and system for training a special object detector to distinguish a foreground object appearing in a sequence of frames for a target domain. The sequence of frames depicts motion of the foreground object in a non-uniform background. The foreground object is detected in a high-confidence subwindow of an initial frame of the sequence, which includes computing a measure of confidence that the high-confidence subwindow includes the foreground object and determining that the measure of confidence exceeds a specified confidence threshold. The foreground object is tracked in respective positive subwindows of subsequent frames appearing after the initial frame. The subsequent frames are within a specified short period of time. The positive subwindows are used to train the special object detector to detect the foreground object in the target domain. The positive subwindows include the subwindow of the initial frame and the respective subwindows of the subsequent frames.

17 Claims, 16 Drawing Sheets

(56) References Cited

OTHER PUBLICATIONS

Felzenszwalb, et al., Cascade Object Detection with Deformable Part Models, [online] 8 pages, Retrieved from the Internet: <URL: http://ttic.uchicago.edu/~dmcallester/cascade.pdf>.

Felzenszwalb et al., Object Detection with Discriminatively Trained Part Based Models, [online] 20 pages, Retrieved from the Internet: <URL: http://www.ics.uci.edu/~dramanan/papers/tmp.pdf>.

Feris et al., Large-Scale Vehicle Detection in Challenging Urban Surveillance Environments, [online] 7 pages, Retrieved from the Internet: <URL: http://users.cecs.anu.edu.au/~jpetterson/papers/2011/FerPetSidBroetal10.pdf>.

Feris et al., Attribute-based Vehicle Search in Crowded Surveillance Videos, [online] 8 pages, Retrieved from the Internet: <URL: http://users.cecs.anu.edu.au/~jpetterson/papers/2011/FerSidZhaPetetal11.pdf>.

Fischler et al., Random Sample Consensus: A Paradigm for Model Fitting With Applications to Image Analysis and Automated Cartography, [online] 42 pages, Retrieved from the Internet: <URL: http://www.dtic.mil/dtic/tr/fulltext/u2/a460585.pdf>, Mar. 1980.

Friedman, et al., Special Invited Paper, Additive Logistic Regression: A Statistical View of Boosting, The Annals of Statistics, 2000, vol. 28, No. 2, 337-407.

Jain et al., Online Domain Adaptation of Pre-Trained Cascade of Classifiers, [online] pp. 577-584, Retrieved from the Internet: <URL: http://people.cs.umass.edu/~elm/papers/cvpr11adaptive.pdf>.

Javed et al., Online Detection and Classification of Moving Objects Using Progressively Improving Detectors, [online] 6 pages, Retrieved from the Internet: <URL: http://www.cs.cmu.edu/~saada/Publications/2005_CVPR_Cotrain.pdf>.

John Platt, Probabilistic Outputs for SVMs and Comparisons to Regularized Likelihood Methods, [online] 17 pages, Retrieved from the Internet: <URL: http://data.clement.farabet.net/pubs/iscas10b.pdf>.

Lecun, et al., Convolutional Networks and Applications in Vision, [online] 4 pages, Retrieved from the Internet: <URL: http://data.clement.farabet.net/pubs/iscas10b.pdf>.

Lienhart et al., CiteSeer, Empirical Analysis of Detection Cascades of Boosted Classified Detection, 2003, [online] 2 pages, Retrieved from the Internet: <URL: http://citeseerx.ist.psu.edu/viewdoc/summary?doi=10.1.1.139.4825>.

Roth et al., CiteSeer, On-line Conservative Learning for Person Detection, 2005, [Online] 2 pages, Retrieved from the Internet: <URL: http://citeseem.ist.psu.edu/viewdoc/summary?doi=10.1.1.144.9557>.

Shi et al., Good Features to Track, 1994 IEEE, [online] pp. 593-600, Retrieved from the Internet: <URL: http://movement.nyu.edu/mocap11f/papers/Iec03_OpenCV_FeaturesFinding.pdf>.

Siddiquie et al., Unsupervised Model Selection for View-Invariant Object Detection in Surveillance Environments, [online] 4 pages, Retrieved from the Internet: <URL: http://www.cs.umd.edu/~behjat/papers/ICPR2012.pdf>.

Stauffer et al., Adaptive background mixture models for real-time tracking, [online] 7 pages, Retrieved from the Internet: <URL: http://www.ai.mit.edu/projects/vsam/Publications/stauffer_cvpr98_track.pdf>.

Tian et al., Robust and Efficient Foreground Analysis for Real-time Video Surveillance, [online] 6 pages, Retrieved from the Internet: <URL: http://media-lab.engr.ccny.cuny.edu/Paper/2005/CVPR05FGAnalysis.pdf>.

Viola et al., Robust Real-time Object Detection, [online] 25 pages, Retrieved from the Internet: <URL: http://research.microsoft.com/en-us/um/people/viola/Pubs/Detect/violaJones_IJCV.pdf>.

Viola et al., Detecting Pedestrians Using Patterns of Motion and Appearance, [online] 8 pages, Retrieved from the Internet: <URL: http://www.merl.com/papers/docs/TR2003-90.pdf>.

* cited by examiner

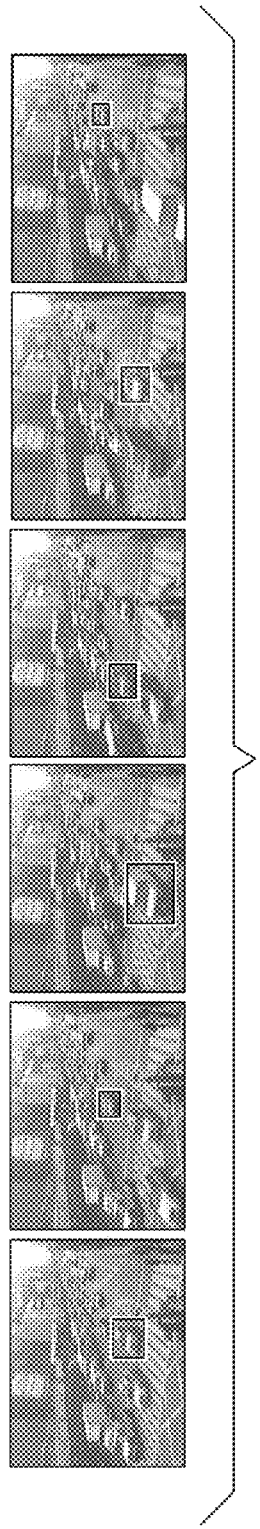
FIG. 4
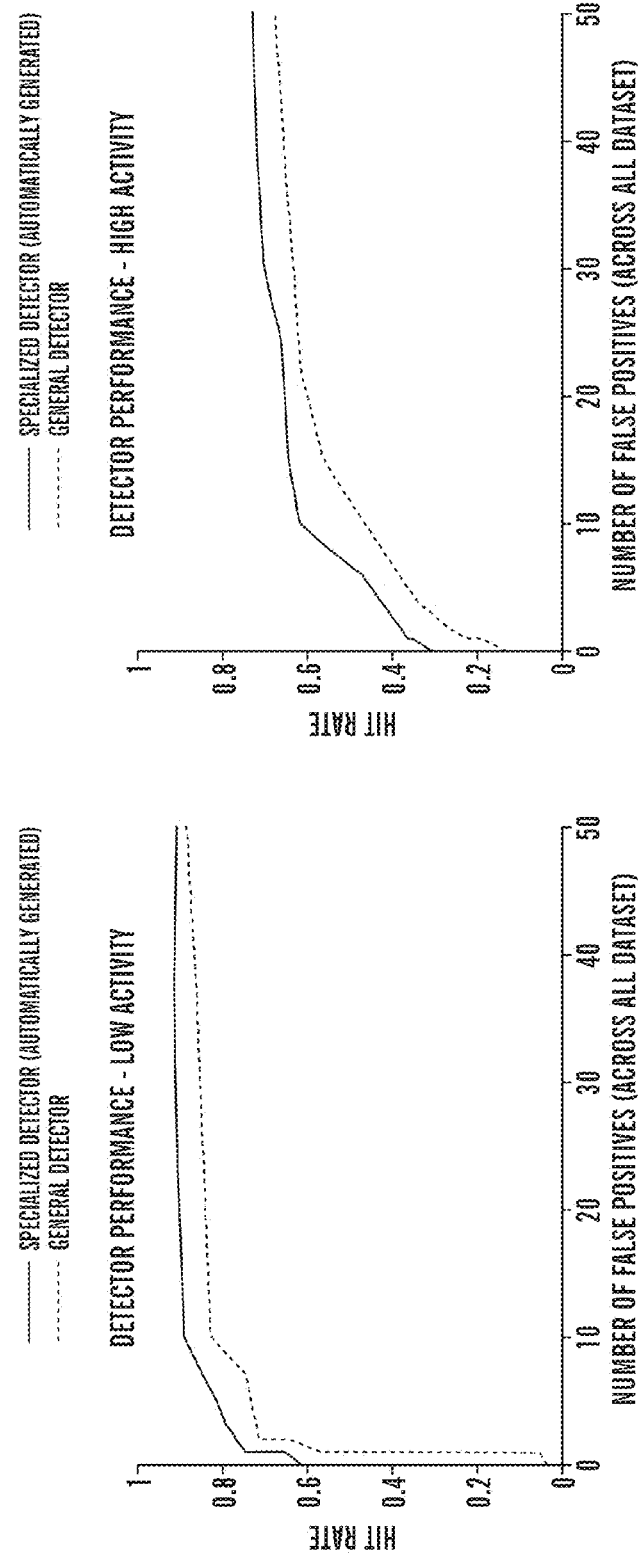
FIG. 5A
FIG. 5B

BOOSTING OBJECT DETECTION PERFORMANCE IN VIDEOS

TECHNICAL FIELD

The present invention relates generally to object detection in videos and more specifically to enhancing performance of to object detection in videos.

BACKGROUND

Object detection plays a fundamental role in intelligent video surveillance systems. The ability to automatically search for objects of interest in large video databases or in real-time video streams often involves, as a pre-requisite, the detection and localization of objects in the video frames.

Traditional surveillance systems usually apply background modeling techniques [(C. Stauffer and W. Grimson, Adaptive background mixture models for real-time tracking, CVPR, 1998, 1); (Y. Tian, M. Lu, and A. Hampapur, Robust and efficient foreground analysis for real-time video surveillance, CVPR, 2005, 1)] for detecting moving objects in the scene, which are efficient and work reasonably well in low-activity scenarios. However, the traditional surveillance systems are limited in their ability to handle typical urban conditions such as crowded scenes and environmental changes like rain, snow, reflections, and shadows. In crowded scenarios, multiple objects are frequently merged into a single motion blob, thereby compromising higher-level tasks such as object classification and extraction of attributes.

Appearance-based object detectors [(N. Dalal and B. Triggs. Histograms of oriented gradients for human detection, CVPR, 2005, 1); (P. Felzenszwalb, R. Girshick, D. McAllester, and D. Ramanan, Object detection with discriminatively trained part based models, IEEE Transactions on PAMI, 2010, 1)] arise as a promising direction to deal with these challenging conditions. Specifically for applications that require real-time processing, cascade detectors based on Haar-like features have been widely used for detection of faces [P. Viola and M. Jones. Robust Real-time Object Detection, International Journal of Computer Vision, 2004, 1, 2, 3, 4], pedestrians [P. Viola, M. Jones, and D. Snowi, Detecting pedestrians using patterns of motion and appearance, ICCV, 2003, 1] and vehicles [R. S. Feris, B. Siddiquie, Y. Zhai, J. Petterson, L. Brown, and S. Pankanti, Attribute-based vehicle search in crowded surveillance videos, ICMR, 2011, 1]. Although significant progress has been made in this area, state-of-the-art object detectors are still not able to generalize well to different camera angles and lighting conditions. As real deployments commonly involve a large number of surveillance cameras, training per-camera detectors is not feasible due to the annotation cost. Online adaptation methods [(V. Jain and E. Learned-Miller, Online domain adaptation of a pre-trained cascade of classifiers, CVPR, 2011, 1, 2); (S. Pan, I. Tsang, J. Kwok, and Q. Yang, Domain adaptation via transfer component analysis, IEEE Transactions on Neural Networks, 2011, 1, 2)] have been proposed to adapt a general detector to specific domains, but the online adaptation methods usually require a small number of manual labels from the target domain. Most methods rely on adaptation of weights only, while keeping the same features and the same computational complexity of the original detector.

Various methods have been proposed for object detection in images and videos. Deformable part-based models [P. Felzenszwalb, R. Girshick, D. McAllester, and D. Ramanan, Object detection with discriminatively trained part based models, IEEE Transactions on PAMI, 2010, 1], classifiers based on histograms of oriented gradient features [N. Dalal and B. Triggs. Histograms of oriented gradients for human detection, CVPR, 2005, 1], and convolutional neural networks [Y. LeCun, K. Kavukvuoglu, and C. Farabet, Convolutional networks and applications in vision, ISCAS, 2010, 1] are examples of successful approaches that have achieved state of-the-art results in several standard datasets. In general, however, these methods run at less than 15 frames per second on conventional machines and therefore may not be applicable to surveillance applications that require processing many video channels per server.

Cascade detectors [(P. Felzenszwalb, R. Girshick, and D. McAllester, Cascade object detection with deformable part models, CVPR, 2010, 2); (P. Viola and M. Jones. Robust Real-time Object Detection, International Journal of Computer Vision, 2004, 1, 2, 3, 4)] have been commonly adopted for efficient processing. Viola and Jones [P. Viola and M. Jones, Robust Real-time Object Detection, International Journal of Computer Vision, 2004, 1, 2, 3, 4] introduced a robust and efficient detector based on a cascade of Adaboost classifiers, using fast-to-compute Haar-like features. Many variants of this algorithm, including different boosting models and different features have been proposed in the past few years. Confidence measures for cascade detectors have not been well studied.

Co-training techniques [(O. Javed, S. Ali, and M. Shah, Online detection and classification of moving objects using progressively improving detectors, CVPR, 2005, 2); (P. Roth, H. Grabner, D. Skocaj, H. Bischof, and Leonardis, On-line conservative learning for person detection, PETS Workshop, 2005, 2)] have been applied to boost the performance of object detection in specific domains, by training separate classifiers on different views of the data. The confidently labeled samples from the first classifier are used to augment the training set of the second classifier and vice versa. The underlying assumption of co-training is that the two views of the data are statistically independent, which may be violated especially when the features are extracted from a single modality.

Several on-line adaptation methods [(V. Jain and E. Learned-Miller. Online domain adaptation of a pre-trained cascade of classifiers, CVPR, 2011, 1, 2); (S. Pan, I. Tsang, J. Kwok, and Q. Yang, Domain adaptation via transfer component analysis, IEEE Transactions on Neural Networks, 2011, 1, 2)] have been proposed to adapt general detectors to specific domains. Usually these techniques either require few manual labels from the target domain or suffer from inaccuracies in capturing online data to correctly update the classifier. With few exceptions [H. Grabner and H. Bischof, Online boosting and vision, CVPR, 2006, 2], only feature weights are adapted and not the features themselves. As a result, the adapted classifier is generally at least as expensive as the original detector. Online learning has also been applied to improve tracking [(H. Grabner, C. Leistner, and H. Bischof, Semi-supervised on-line boosting for robust tracking, ECCV, 2008, 2); (S. Avidan, Ensemble tracking, IEEE Transactions on PAMI, 2007, 2)], with the assumption that an object appears in one location only.

Feris et al [R. S. Feris, J. Petterson, B. Siddiquie, L. Brown, and S. Pankanti, Large-scale vehicle detection in challenging urban surveillance environments, WACV, 2011, 2] proposed a technique to automatically collect training data from the target domain and learn a classifier. However, the technique requires user input to specify regions of-interest and attributes such as motion direction and acceptable $\Delta$s of the object of interest. More recently, Siddiquie et al [B. Siddiquie, R. Feris, A. Datta, and L. Davis, Unsupervised model selection for view-invariant object detection in surveillance environments, *ICPR*, 2012, 2] proposed a method that takes into account scene geometry constrains to transfer knowledge from source domains to target domains. This approach can even achieve better performance than a detector trained with samples from the target domain, but requires a large battery of source domain detectors covering different poses and lighting conditions.

There are existing algorithms to distinguish foreground objects from background, based on brightness, color, and features beyond the visible spectrum such as infrared. These algorithms typically rely on thresholds, for example, a brightness threshold, to indicate the presence of a foreground object. For example, the thresholds may be manually adjusted by a human to account for variations in lighting, camera response, etc. to ensure that a vehicle's image surpassed the applicable thresholds to distinguish the vehicle from the background. However, the manual adjustment procedure is inefficient and subject to human error.

BRIEF SUMMARY

The present invention provides a method and system for training a special object detector to distinguish a foreground object appearing in a sequence of frames for a target domain. The sequence of frames depicts motion of the foreground object in a non-uniform background. Each frame in the sequence before a last frame in the sequence corresponds to a time earlier than a time to which an immediately next frame in the sequence corresponds. The foreground object is detected in a high-confidence subwindow of an initial frame of the sequence. Detecting the foreground object comprises computing a measure of confidence that the subwindow comprises the foreground object and determining that the measure of confidence exceeds a specified confidence threshold. The foreground object is tracked in respective positive subwindows of a plurality of subsequent frames appearing after the initial frame in the sequence of frames, wherein the subsequent frames are within a specified short period of time. The positive subwindows are fed to a learning engine for use in training the special object detector to detect the foreground object in the target domain, wherein the positive subwindows include the subwindow of the initial frame and the respective subwindows of the plurality of subsequent frames.

BRIEF DESCRIPTION OF THE DRAWINGS

FIG. 4 depicts examples of high-confidence samples selected by a general detector using the confidence measure of the present invention.

FIGS. 5A and 5B depict a comparison of the general-domain detector with the automatically generated detector in the target domain in low activity (FIG. 5A) and crowded scenes (FIG. 5B), in accordance with embodiments of the present invention.

DETAILED DESCRIPTION

Figure 1:
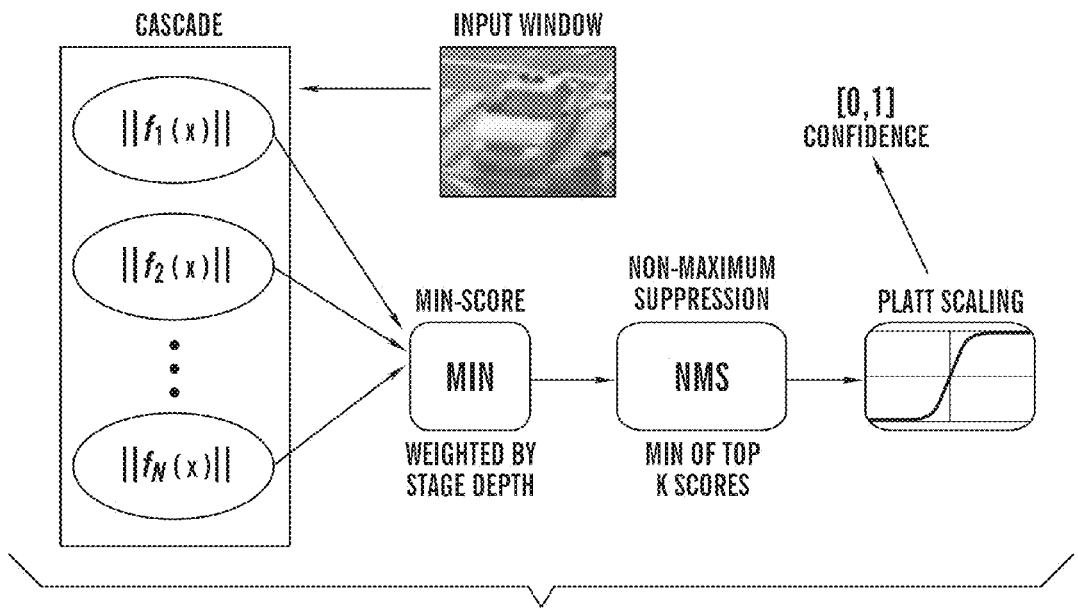
FIG. 1 depicts a determination of a confidence measure for cascade detectors, in accordance with embodiments of the present invention.

The present invention presents a novel approach to automatically create efficient and accurate specific-domain object detectors from videos, using samples acquired with the help of a more expensive general-domain detector. The method of the present invention requires no manual labels from the target domain (e.g., field of view from a new camera). Training data are automatically collected using tracking over short periods of time from high-confidence samples selected by the general detector. In this context, a novel confidence measure is presented for detectors based on a cascade of classifiers, frequently adopted for computer vision applications that require real-time processing. The novel approach of the present invention is demonstrated on the problem of vehicle detection in crowded surveillance videos, showing that an automatically generated detector significantly outperforms the original general detector with much less feature computations.

The novel method of the present invention for creating specific-domain object detectors may be implemented without requiring manual labels from the target domain and provides a confidence measure for cascade detectors. This is a largely unaddressed problem in computer vision, as current work only treats cascade detectors as binary output classifiers without associated confidence. The novel method of the present invention automatically collects training samples from the target domain. The confidence measure selects high-confidence detected samples from the general detector in the target domain, and then collects positive samples from tracking over short periods of time (tracklets of successive frames following an initial frame containing a high-confidence subwindow). These positive samples contain variations such as occlusions which may be complementary to the general detector. Negative samples are also generated by using regions around high confidence samples as well as samples with different aspect ratio of the object of interest. By training a specific-domain object detector from the automatically collected data, the present invention obtains significant accuracy improvement over the general detector with much less feature computations. Experimental analysis shows the usefulness of the proposed approach on the problem of vehicle detection in crowded surveillance videos.

The detailed description herein includes the following sections:
A. Confidence measure For Cascade Detectors
B. Learning Specific-Domain Detectors
   B1. Positive Samples from Tracklets
   B2. Negative Samples
C. Detector Learning
D. Experiments
E. Future Work
F. Computer System
G. Implementation A. Confidence Measure for Cascade Detectors Cascade detectors include a set of stage classifiers which are applied sequentially (i.e., in stages) to classify a particular image sample. During this process, if any stage detector classifies the sample as negative, the process ends and the sample is immediately considered as negative. The result is positive only if all stage detectors in the cascade classy the sample as positive.

The present invention presents a confidence measure associated with the output of cascade detectors, allowing the results to be ranked according to confidence. The confidence measure ensures that the high-confidence positive samples are true positives which can be used for automatic data collection. A cascade detector F(x) comprises N stage classifiers $f_i(x)$, i=1 ... N, wherein N denotes the number of stages of classification and N is at least 2 and wherein x denotes a subwindow (i.e., image sample) of a frame. The stage classifier $f_i(x)$ for stage i (i=1 ... N) may be based on boosting in one embodiment which is expressed in Equation (1) as a linear combination of weak classifiers $h^i_t(x)$ for input image sample x with a bias $\theta^i$ for stage i, wherein the bias $\theta^i$ serves as a threshold, and wherein T is a total number of weak classifiers and t indexes the $t^{th}$ weak classifiers $h^i_t(x)$ at stage i.

$$f_i(x) = \sum_{t=1}^{T} w^i_t h^i_t(x) - \theta^i \quad (1)$$

The weak classifiers $h^i_t(x)$ are binary classifiers. The weights $w^i_t$ are scalars determined in one embodiment based on boosting.

Classifiers not based on boosting are within the scope of the present invention.

Given the input image sample x, the stage classifier $f_i(x)$ generates a scalar output whose polarity (i.e., sign of $f_i(x)$) determines class membership. The magnitude $\|f_i(x)\|$ can be interpreted as a measure of belief or certainty in the decision made. Nearly all binary classifiers can be viewed in these terms. For density-based classifiers (Linear, Quadratic and Fisher), the output function $f_i(x)$ is a log likelihood ratio, whereas for kernel-based classifiers (Nearest-Neighbor, RBFs and SVMs), the output is a "potential field" related to the distance from the separating boundary.

According to the cascade principle, if a single stage $f_i$ has low confidence $\|f_i(x)\|$, the cascade output confidence cannot be high, even if all other stages have high confidence scores. In other words, a high-confidence sample must have high confidences in all stage classifiers. In light of this property, the present invention does not use measurements such as max-confidence or even the sum of confidences if such measures are not properly weighted.

The present invention adopts a strategy of using the minimum of all stage classifier scores which ensures that high-confidence samples will do consistently well in all stage classifiers. Assuming that an input image sample x progresses through all the stages of the cascade, an intermediate cascade confidence score $\delta(x)$ is defined in accordance with Equation (2).

$$\delta(x) = w_d \left( \min_{1 \leq i \leq N} \|f_i(x)\| \right) \quad (2)$$

In one embodiment, $w_d$ is a weight proportional to the depth of the minimum stage classifier score, so that samples that have low confidence in early stages are penalized. The depth "d" is a stage classifier index and corresponds to "i" in Equation (1). In addition, the non-maximum suppression step is taken into account to improve the confidence measure. Multiple detection windows in nearby image locations and scales are grouped together to produce a single output detection window. Indeed, most implementations require a minimum number of neighboring detection windows for firing the detector. For a particular image sample x, the set $\Delta$ is determined in accordance with Equation (3).

$$\Delta = \{\delta(x)\} \cup \{\delta_{m_1}, \delta_{m_2}, \ldots, \delta_{m_M}\} \quad (3)$$

where $\delta(x)$ is the confidence score for the sample x from Equation (2) and $\{\delta_{m_1}\}$, i=1 ... M, corresponds to the set of scores of the M neighboring detection windows. Let topK(.) be a function that returns the K largest elements of a set and fills out with zeros in case the cardinality of the set is less than K. The refined confidence $\alpha(x)$ score for an image sample x is defined as:

$$\alpha(x) = \min\{topK(\Delta)\} \quad (4)$$

It is expected that a high-confidence example should have at least K high-confidence neighboring window scores. In one embodiment, K=3. Generally, K is in a range of 1 to M+1.

The final confidence measure C(x) for the cascade detector is obtained by normalizing the score $\alpha(x)$ to a specified range such as the range of 0 to 1. In one embodiment, this is done by using Platt Scaling [J. Platt. Probabilistic outputs for support vector machines and comparison to regularized likelihood methods, *Advances in Large Margin Classifiers*, 1999, 3] in accordance with Equation (5), wherein the output is passed through a sigmoid distribution to obtain calibrated probabilities.

$$C(x) = \frac{1}{1 + \exp(A\alpha(x) + B)} \quad (5)$$

The parameters A and B may be fitted using maximum likelihood estimation from the training set.

Generally, $\alpha(x)$ may be normalized to a specified range by any known scaling technique such as, inter alia, linear scaling.

FIG. 1 depicts a determination of the confidence measure C(x) for cascade detectors, in accordance with embodiments of the present invention. FIG. 1 summarizes the steps described supra for calculating C(x).

B. Learning Specific-Domain Detectors

Given a general detector (e.g., a car detector trained with images from multiple cameras), and a video from a specific target domain (e.g., image field of video from a particular surveillance camera), the present invention creates a more efficient and more accurate detector for the target domain. Positive and negative samples are automatically collected from the target domain using the general detector, and then a new special object detector for the target domain is generated using the collected samples. Sections B.1 and B.2 infra describe automatic data collection and detector re-training. In one embodiment, boosted cascade detectors are utilized [P. Viola and M. Jones. Robust Real-time Object Detection, *International Journal of Computer Vision*, 2004, 1, 2, 3, 4] for both general and specialized detectors.

B1. Positive Samples from Tracklets

Figure 2:
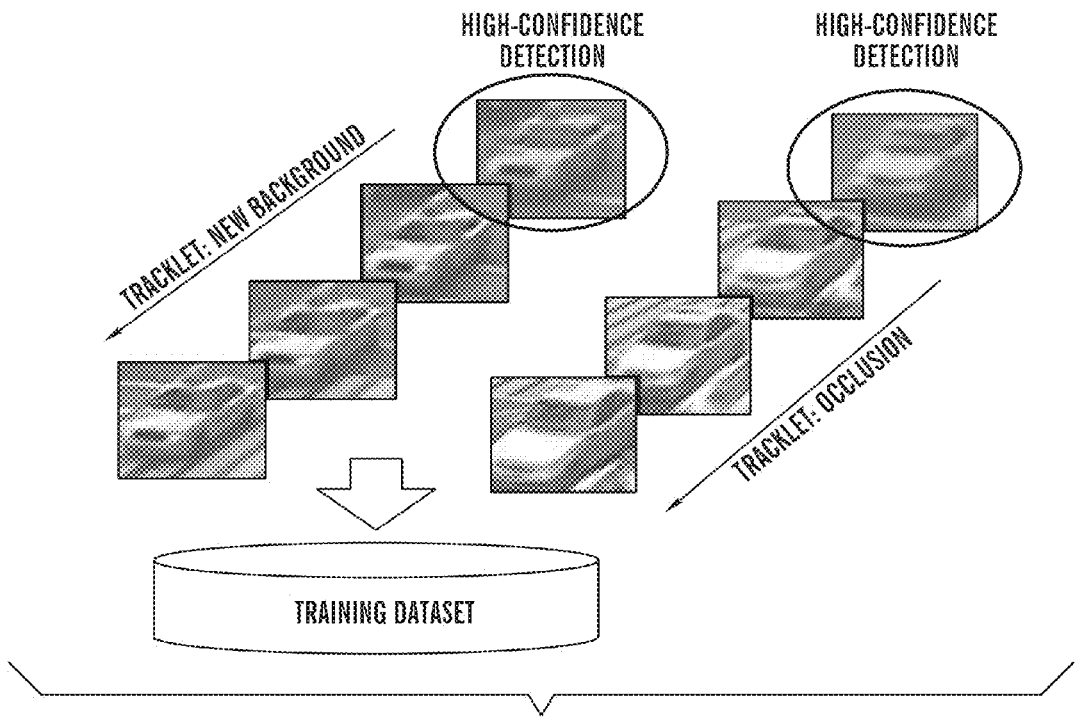
FIG. 2 depicts examples of high-confidence detections and corresponding tracklets, in accordance with embodiments of the present invention.

FIG. 2 depicts examples of high-confidence detections and corresponding tracklets, in accordance with embodiments of the present invention. The collected samples contain additional information such as occlusions and background texture specific to the target domain.

Automatic extraction of positive samples in the target domain comprises two steps: 1) detection of high-confidence samples using the general detector; and 2) for each high-confidence detection, tracking is performed over a small number (F) of frames (tracklet) after the frame containing a high-confidence subwindow. For each tracklet in FIG. 2, F=3. In one embodiment, F is in the range of 1 to 10. In one embodiment, F is in the range of 5 to 20. The F frames of the tracklet are added to the set of positive training data. This process is illustrated in FIG. 2 which depicts examples of high-confidence detections and corresponding tracklets, in accordance with embodiments of the present invention. The collected samples contain additional information such as occlusions and background texture specific to the target domain. The tracklet samples are expected to have variations that are specific to the target domain and potentially different from the training data distribution of the general detector. As can be seen in FIG. 2, the tracklet samples include different information from the original high-confidence detection window, such as a cluttered background and occlusions. Thus, the present invention trains a detector with more robustness to crowded scenes and specific background texture of the target domain.

High-confidence detection windows are selected by thresholding the confidence measure described in Section A. The confidence measure threshold is tuned based on a validation set, enforcing zero or very few false alarms while tolerating more false negatives.

Given a high-confidence detection window, feature tracking such KLT [J. Shi and C. Tomasi, Good features to track, *CVPR*, 1994, 3] follows the object across the video. The following three improvements to the standard KLT feature tracking are included in the present invention. The first improvement recognizes that not all pixels within the detection window belong to the object since some of the pixels belong to the background. Tracking all the features within the window may mislead the tracklet. Therefore, background subtraction is utilized to only track features that lie on the foreground. The second improvement recognizes that, in a busy scene, there is potential for occlusions from neighboring frames of a tracklet. Therefore, a robust estimation of motion may be performed using Random Sample and Consensus (RANSAC) [M. Fischler and R. Bolles, Random sample consensus: A paradigm for model fitting with applications to image analysis and automated cartography, *Communications of the ACM*, 1981, 3]. The third improvement recognizes that, since certain parts of a vehicle may be textureless or under blur, certain features may be less reliable than others. Less reliable features are detected by accumulating the error attributed to each feature over tracking duration and assigning less weight to more error-prone features during RANSAC robust motion estimation.

Tracking an object over a long period of time is a very challenging problem. In one embodiment, short tracks encompassing 10 frames produces very reliable results. The experimental analysis described in Section D infra obtains a large number of positive samples from the target domain without false alarms, by combining high-confidence detections with tracklets.

B2. Negative Samples

Patches are extracted from a collection of around 1000 web images that do not contain the object of interest to create a large set of negative samples. In addition, negative samples are automatically captured from the target domain using the following two strategies. The first strategy is to extract samples related to groups or parts of objects. The second strategy is to extract samples that have a different aspect ratio of the considered object.

Figure 3:
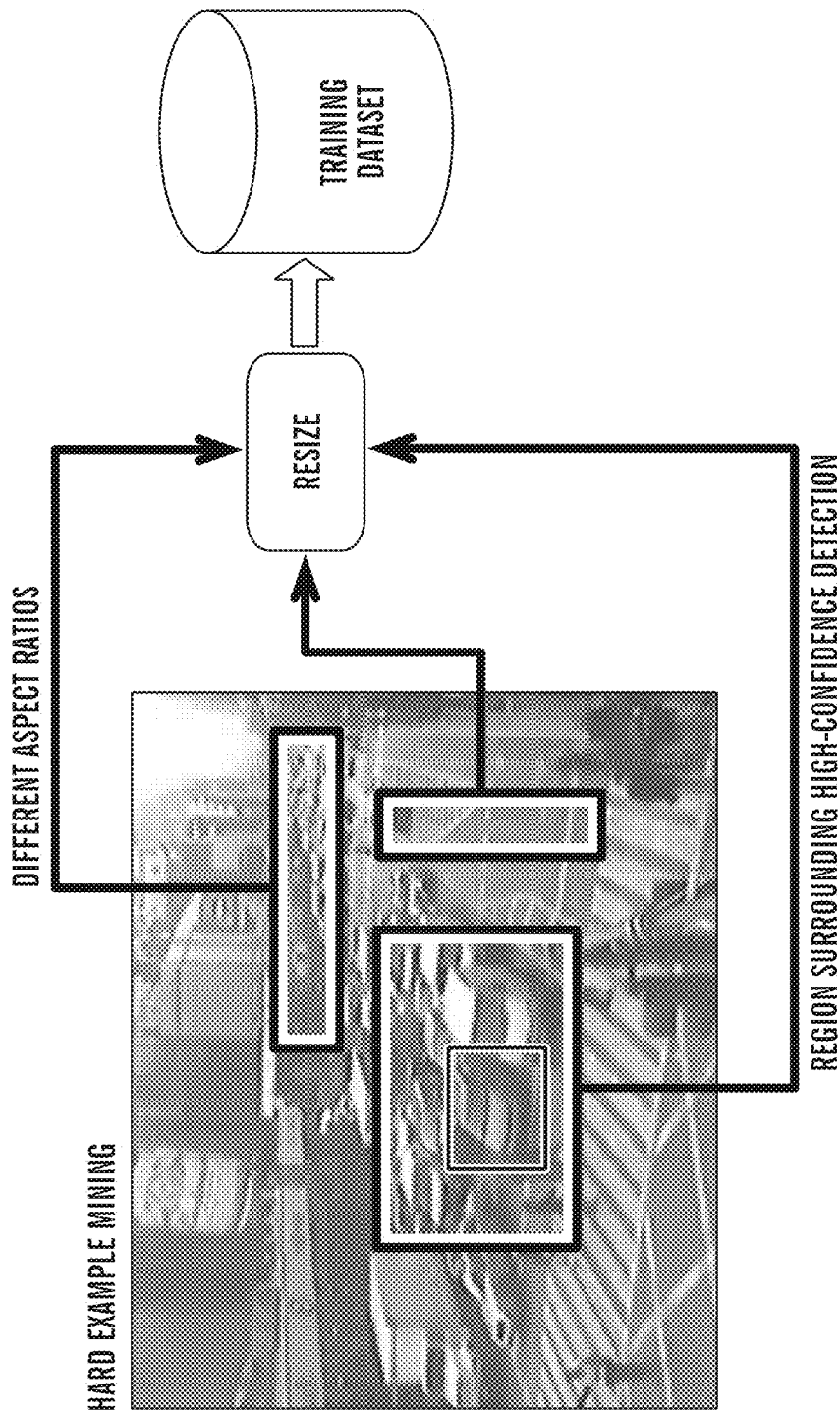
FIG. 3 depicts examples of negative patches automatically extracted from a crowded traffic scene, in accordance with embodiments of the present invention.

The first strategy comprises extracting windows that are located close to a high-confidence detection window, but with different sizes. As an example, in a crowded traffic scene as depicted in FIG. 3 discussed infra, a negative window containing a high-confidence detection could comprise a group of vehicles. Capturing such kind of negative samples is relevant, since false alarms of groups or parts of vehicles are typical in traffic scenes.

The second strategy is to sample negative patches from the video frames using sub-windows therein with different aspect ratios of the considered object and to re-size the sub-windows to the object size. The re-sized windows could be potentially similar to false alarms in the scene that have the object size. Since there are many possible windows to be considered as negative samples over the frames, the windows that are considered "hard examples" (i.e., the negative windows with high detection confidence) are selected. FIG. 3 depicts examples of negative patches automatically extracted from a crowded traffic scene, in accordance with embodiments of the present invention.

In practice, since the subwindows of the negative samples do not contain the object, by definition, the aspect ratios pertaining to the negative samples are with respect to mutually orthogonal dimensions of the subwindows of the negative samples. The aspect ratio of a subwindow is defined as $D_{max}/D_{min}$, wherein $D_{max}$ and $D_{min}$ are maximum and minimum mutually orthogonal linear dimensions of the subwindow.

C. Detector Learning

Both the general and the specialized detectors are trained using any known framework such as a framework similar to the work of Viola and Jones [P. Viola and M. Jones, Robust Real-time Object Detection, *International Journal of Computer Vision*, 2004, 1, 2, 3, 4]. The Viola and Jones framework comprises a cascade of Adaboost classifiers, where the weak learners are simple thresholds over Haarlike features. Each stage of the cascade is tuned to minimize false negatives at the expense of a larger number of false positives, which allows fast inference by quickly discarding background images. Bootstrapping is also employed by selecting negatives examples where the previous stages have failed. The inventors of the present invention have used Gentle Adaboost learning instead of the traditional discrete Adaboost classifiers and have achieved superior results with decision stumps [(R. Lienhart, A. Kuranov, and V. Pisarevsky, Empirical analysis of detection cascades of boosted classifiers for rapid object detection, *DAGM 25th Pattern Recognition Symposium*, 2003, 4); (J. Friedman, T. Hastie, and R. Tibshirani, Additive logistic regression: a statistical view of boosting, *Annals of*

Statistics, 38(2):337-374, 2000, 4)]. At test time, the detectors are applied using a standard sliding window scheme.

D. Experiments

This section demonstrates the approach of the present invention to the problem of vehicle detection in surveillance videos. The general-domain detector is a cascade Adaboost detector trained with 4000 vehicle images obtained from 20+ surveillance cameras. This study considers a single vehicle pose only, with slight variation (around 30 degrees maximum pose variation). The negative set comprised about 1000 images obtained from the web and also from surveillance videos at selected times where no vehicles were present in the scene. Several bootstrap rounds were performed during training to improve accuracy, obtaining a detector with 40 stages.

FIG. 4 depicts examples of high-confidence samples selected by the general detector using the confidence measure of the present invention. The confidence measure C(x) of Equation (5) enabled automatic collection of useful data for training without false alarms, as will described infra. The same level of accuracy was not reached with other confidence measures that were tested, such as relying only on the confidence of the last stage classifier, which focus on discrimination from vehicle-like patterns.

In order to evaluate the approach of the present invention, a challenging test set was collected from a specific surveillance camera (target domain) containing 229 images and 374 vehicles of a single pose. The images were captured in different months, covering different weather conditions including sunny and rainy days, different lighting effects such as shadows and specularities, and different periods of time such as morning and evening. In addition, the test set was split into two groups: high activity (i.e., crowded scenes with many occlusions (104 images and 217 vehicles) and low activity (125 images and 157 vehicles).

The automatic data collection technique described supra was applied to a five-hour (from 2pm to 7pm) video sequence of the same camera but in a different day/month of the period used to capture the test images. In this manner, 4000 positive training samples were automatically collected without any false alarms. For the negative data, the automatic data collection technique utilized the same set of non-vehicle images used to train the general detector (around 1000 images) plus thousands of negative samples automatically collected from the target domain. Using these training samples collected from the target domain, a 20-stage cascade Adaboost classifier was learnt. This detector is referred to herein as a specialized or specific-domain object detector.

FIGS. 5A and 5B depict a comparison of the general-domain detector with the automatically generated detector in the target domain in low activity (FIG. 5A) and crowded scenes (FIG. 5B), in accordance with embodiments of the present invention. It is noted that the approach of the present invention outperforms the general detector in both low activity and crowded scenes. In fact, the data collection technique of the present invention is a capable of capturing data in highly crowded scenarios.

A key advantage of the approach of the present invention is having obtained improved accuracy in the target domain with significant gains in terms of efficiency. The specialized detector of the present invention achieves superior performance with only 20 stages, which is half of the number of stages of the general detector.

Figure 6:
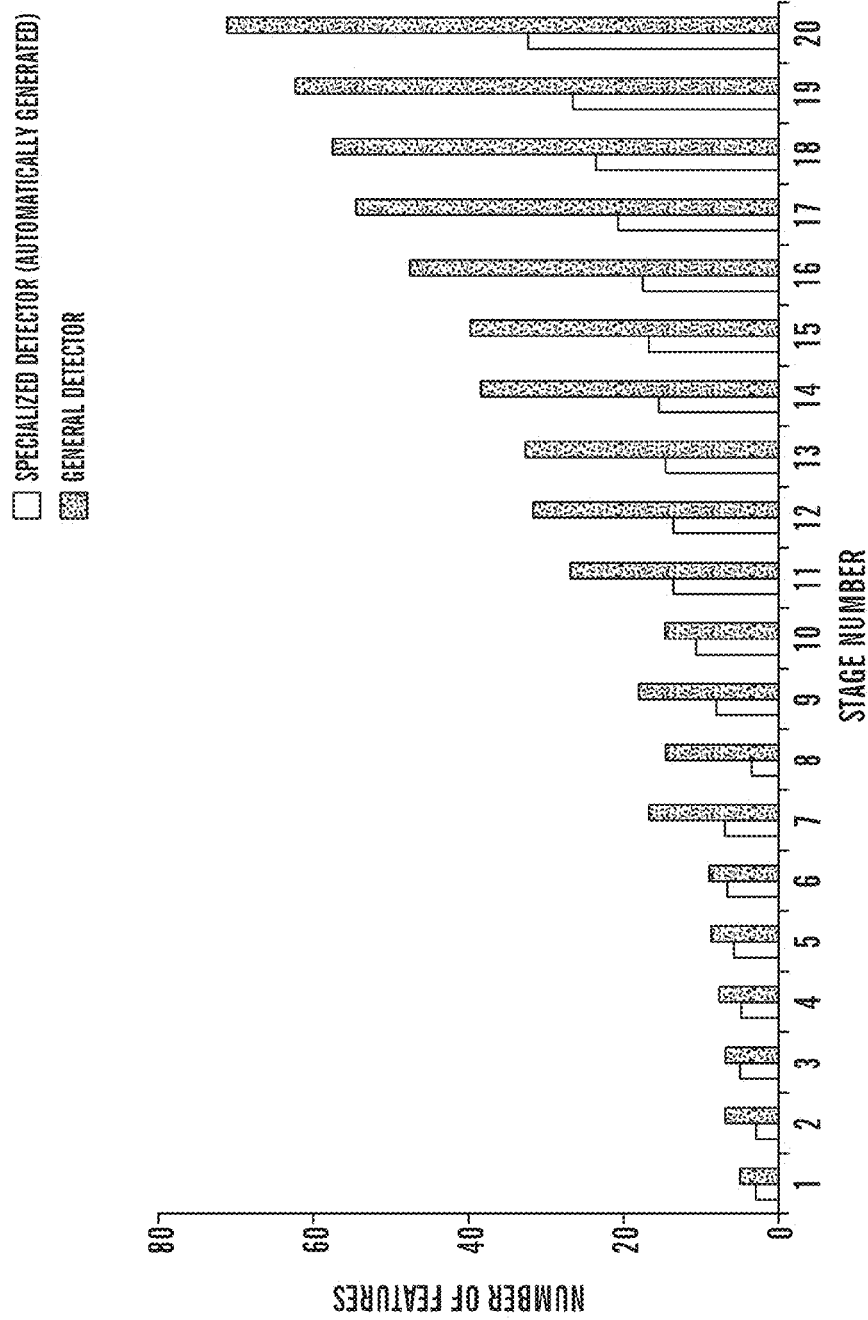
FIG. 6 depicts a plot of number of features versus stage number for the general detector and the specialized detector, in accordance with embodiments of the present invention.

FIG. 6 depicts a plot of number of features versus stage number for the general detector and the specialized detector, in accordance with embodiments of the present invention. FIG. 6 compares the number of features of the initial 20 stages of the general detector with that of specialized detector. The specific-domain detector has much fewer features in each of the stages than the general detector and therefore is significantly more efficient. The general detector has an additional 20 stages that are not shown in the plot of FIG. 6. The reason for this computational gain is that the target domain data has substantially less appearance variations than the general domain, therefore requiring much less features for discrimination. This is an advantage over online adaptation methods which tend to keep the complexity of the original classifier without improving the efficiency.

E. Future Work

The present invention provides a novel approach for learning specific-domain detectors in surveillance videos. Methods of the present invention rely on a general-domain detector and assumes no labels from the target domain. A novel confidence measure is provided for cascade object detectors, which is utilized to select high-confidence examples in the target domain, using the general detector. Tracking is then performed over short periods of time to collect new samples that may include new information such as occlusions, background texture, and slight variations in object pose, all specific to the target domain. Negative examples may also be automatically collected from the target domain. The approach of the present invention has been demonstrated on the problem of vehicle detection in complex surveillance videos, showing that an automatically generated specific-domain detector significantly outperforms the original general detector, not only in accuracy, but also in efficiency, as it requires much less feature computations.

Future work may investigate the use of high-confidence tracks obtained by background subtraction to augment data collection with more diverse data. Especially in low-activity scenarios, background modeling techniques work very reliably. Extracting samples from both tracklets and motion blobs obtained by background subtraction could produce a richer data collection mechanism in the target domain and potentially improve accuracy.

The present invention trains a specific domain-detector using automatically collected data from a single day. Collecting more training data over extended periods of time may improve the robustness of the generated classifier.

F. Computer System

Figure 7:
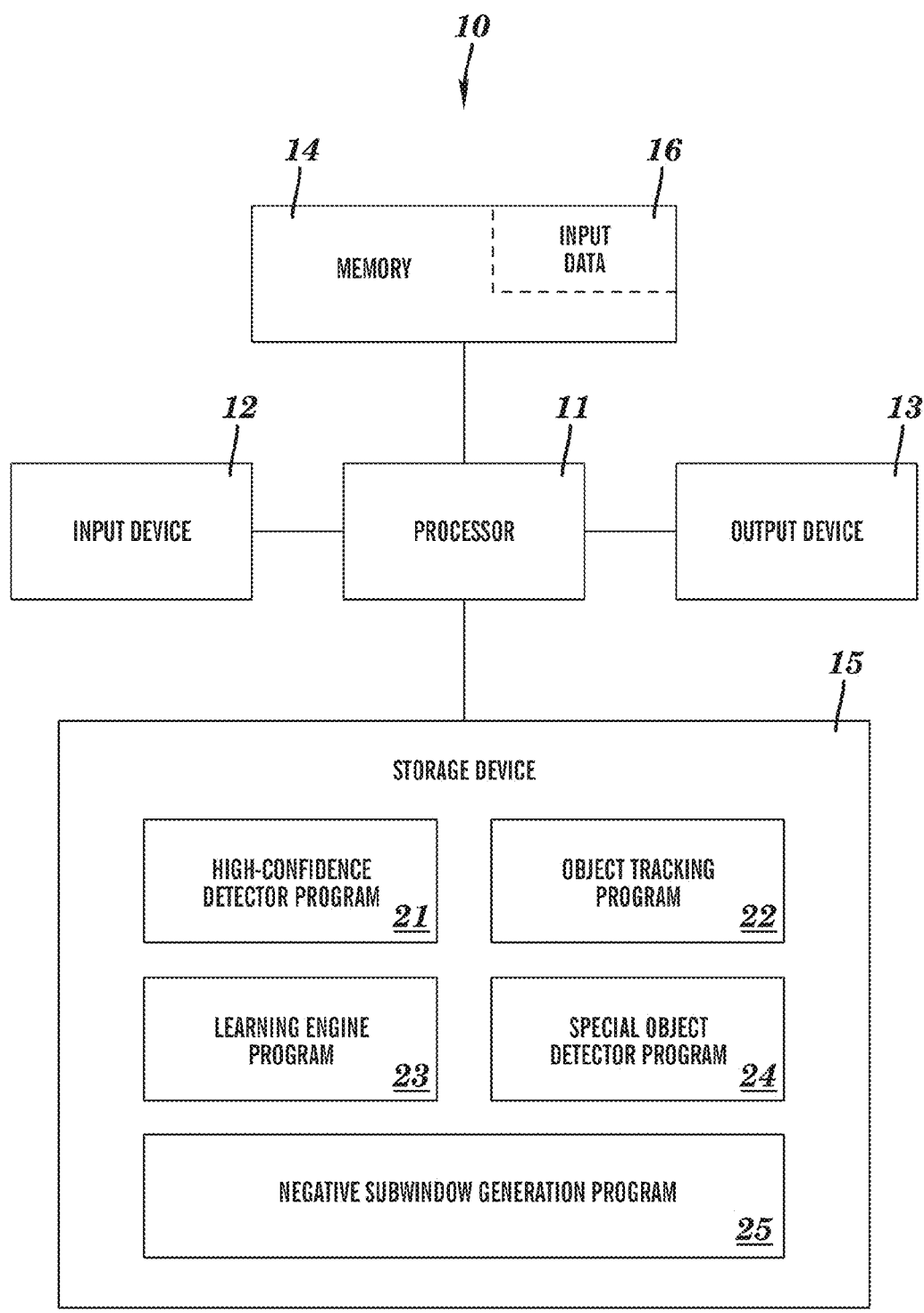
FIG. 7 illustrates a computer system for training a special object detector to distinguish a foreground object appearing in a sequence of frames for a target domain, in accordance with embodiments of the present invention.

FIG. 7 illustrates a computer system 10 for training a special object detector to distinguish a foreground object appearing in a sequence of frames for a target domain, in accordance with embodiments of the present invention. The computer system 10 comprises a processor 11, an input device 12 coupled to the processor 11, an output device 13 coupled to the processor 11, a memory 14 coupled to the processor 11, and a storage device 15 each coupled to the processor 11. The input device 12 may be, inter alia, a keyboard, a mouse, etc. The output device 13 may be, inter alia, a printer, a plotter, a computer screen, a magnetic tape, a removable hard disk, a floppy disk, etc. The memory 14 may be, inter alia, random access memory (RAM). The storage device 15 may be, inter alia, a hard disk, a floppy disk, a magnetic tape, an optical storage such as a compact disc (CD) or a digital video disc (DVD), etc. The storage device 15 comprises program code configured to be executed by the processor 11 via the memory 14 to perform a method for training a special object detector to distinguish a foreground object appearing in a sequence of frames for a target domain.

The program code comprises software programs, each software program including program instructions. The software programs include a high-confidence detection program 21, an object tracking program 22, a learning engine program 23, a special object detector program 24, and a negative subwindow generation program 25. The high-confidence detection program 21 detects a foreground object in a high-confidence subwindow of an initial frame of a sequence of frames for a target domain. The object tracking program 22 tracks the foreground object in respective positive subwindows of a plurality of subsequent frames appearing after the initial frame in the sequence of frames. The learning engine program 23 trains a special object detector to detect the foreground object in the target domain. The special object detector program 24 detects the foreground object in the target domain after being trained. The negative subwindow selection program 25 selects negative subwindows of randomly selected windows for detecting the foreground object in the target domain.

The processor 11 executes the programs 21-25. The memory 14 may include input data 16. The input data 16 includes input data required by the programs 21-25. The output device 13 displays output from the programs 21-25. The storage device 15 may represent a tangible computer readable storage device, or alternatively a plurality of tangible computer readable storage devices, storing the programs 21-25 for execution by the processor 11, or alternatively by a plurality of processors, via the memory 14. Generally, the programs 21-25 may be stored on a single storage device or may be stored by being distributed among a plurality of storage devices in any manner known in the art. A computer program product (or, alternatively, an article of manufacture) of the computer system 10 may comprise the storage device 15, or a plurality of storage devices, storing the programs 21-25 for execution by the processor 11, or alternatively by a plurality of processors, via the memory 14. The scope of "computer readable storage device" does not include a signal propagation medium.

While FIG. 7 shows the computer system 10 as a particular configuration of hardware and software, any configuration of hardware and software, as would be known to a person of ordinary skill in the art, may be utilized for the purposes stated supra in conjunction with the particular computer system 10 of FIG. 7. For example, the storage device 15 may represent one or more tangible computer readable storage devices for execution by the processor 11, or alternatively by a plurality of processors, via the memory 14.

G. Implementation

FIGS. 8-12 describe methods provided by the present invention, which may be implemented by the software programs 21-25 depicted in FIG. 7.

Figure 8:
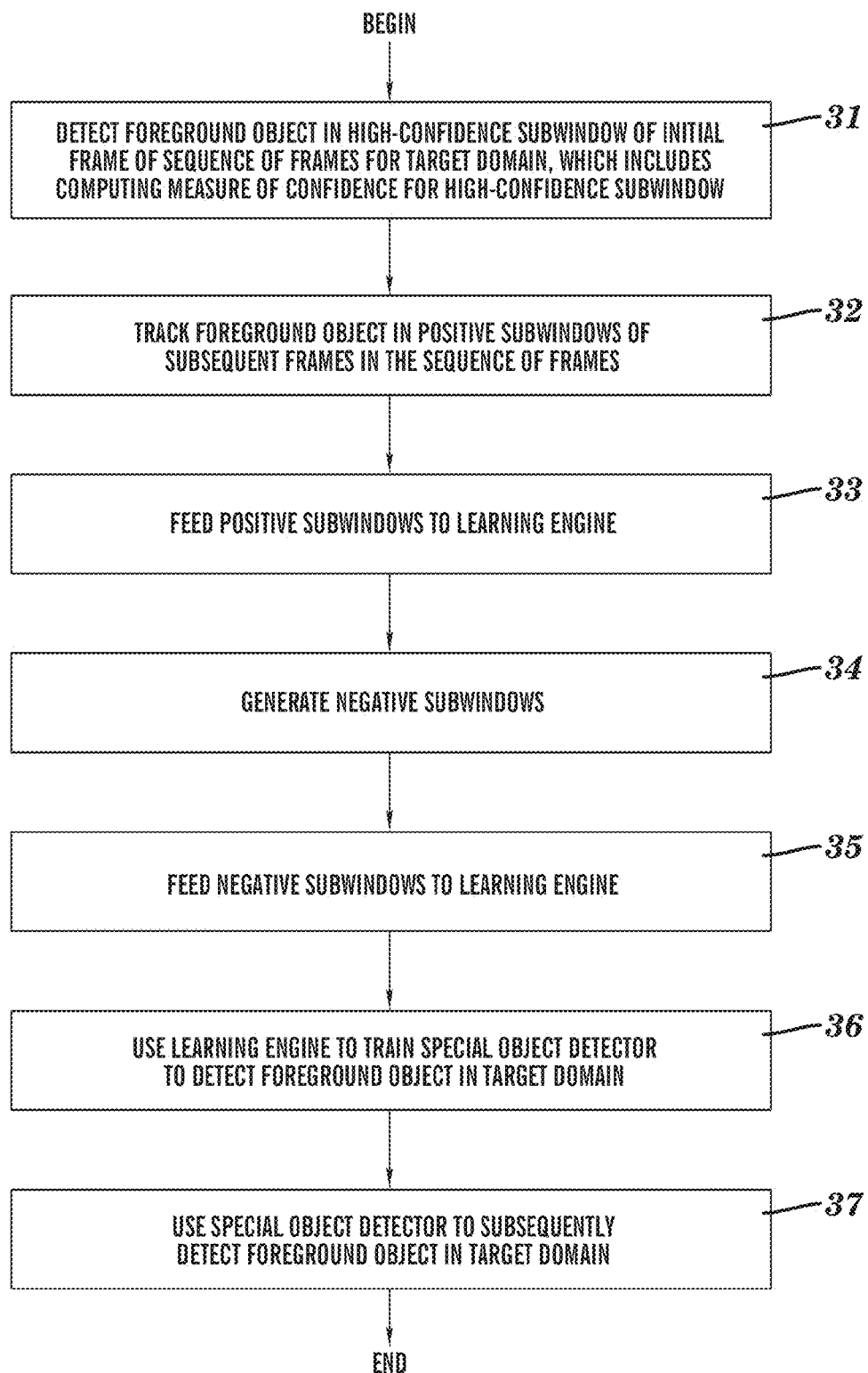
FIG. 8 is a flow chart describing a method for training a special object detector to distinguish a foreground object appearing in a sequence of frames for a target domain, in accordance with embodiments of the present invention.

FIG. 8 is a flow chart describing a method for training a special object detector to distinguish a foreground object appearing in a sequence of frames for a target domain, in accordance with embodiments of the present invention. The target domain is a particular field of view such as, inter alia, the field of view of a new camera. The sequence of frames depicts motion of the foreground object in a non-uniform background. Each frame in the sequence before a last frame in the sequence corresponds to a time earlier than a time to which an immediately next frame in the sequence corresponds. FIG. 8 includes steps 31-37.

Figure 13:
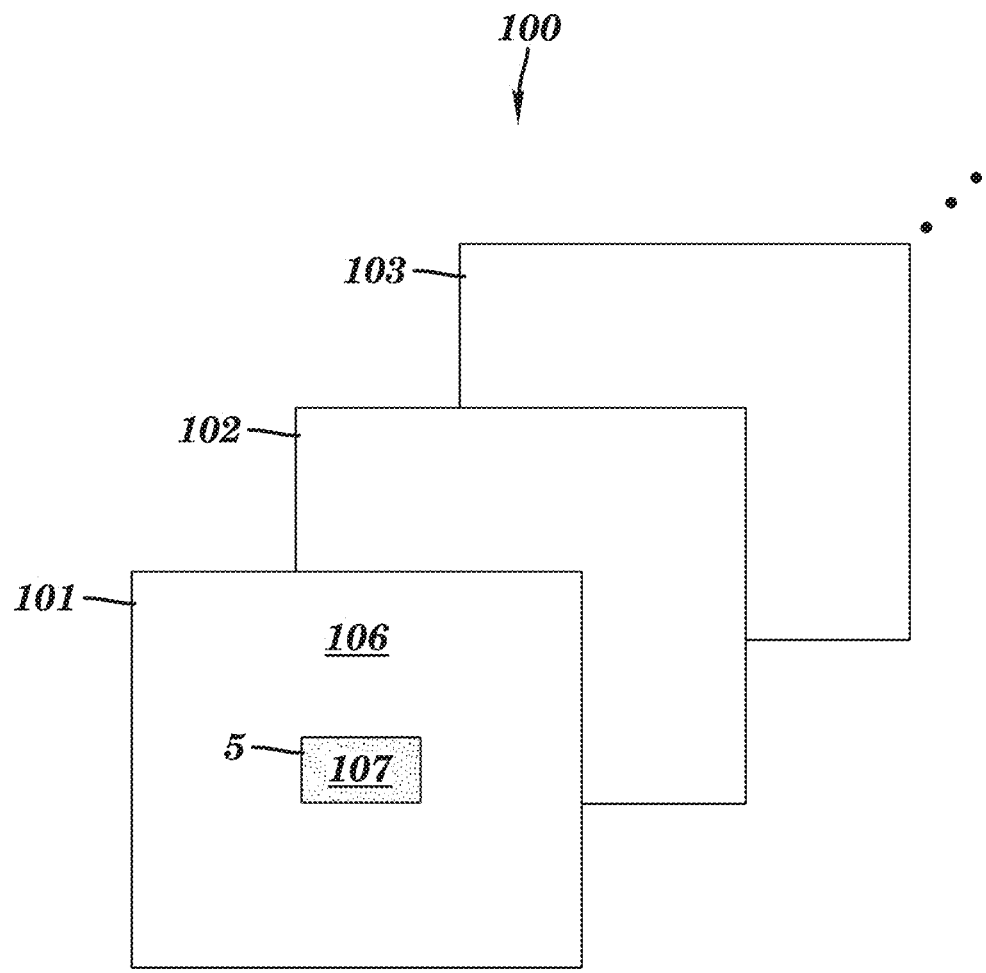
FIG. 13 depicts a sequence of frames with a foreground object in a background depicted in a frame of the sequence, in accordance with embodiments of the present invention.
Figure 14A:
FIGS. 14A-14D illustrate successive movements of a sliding window in a frame from FIG. 14A to FIG. 14D until a subwindow comprising the foreground object is found, in accordance with embodiments of the present invention.
Figure 14B:
Figure 14C:
Figure 14D:

FIG. 13 depicts a sequence 100 of frames 101, 102, 103, . . . with a foreground object 107 in a background 106 depicted in frame 101 of the sequence, in accordance with embodiments of the present invention. In one embodiment, frame 101 is an initial frame, and frames 102, 103, . . . are subsequent frames of a tracklet.

In step 31 of FIG. 8, the high-confidence detector program 21 detects the foreground object 107 in a high-confidence subwindow 5 of the initial frame 101 of the sequence 100 in FIG. 13.

The high-confidence detector program 21 applies a sliding subwindow over the input image and for each position/scale of the sliding subwindow, the program 21 checks whether that particular location has the object or not by using cascade detection with classifiers as described supra in Section A. The output is a set of bounding boxes (i.e., subwindows that were classified as, for example, a subwindow containing a car).

FIGS. 14A-14D illustrate successive movements of a sliding window in a frame from FIG. 14A to FIG. 14D until a subwindow comprising the foreground object is found, in accordance with embodiments of the present invention.

Figure 9:
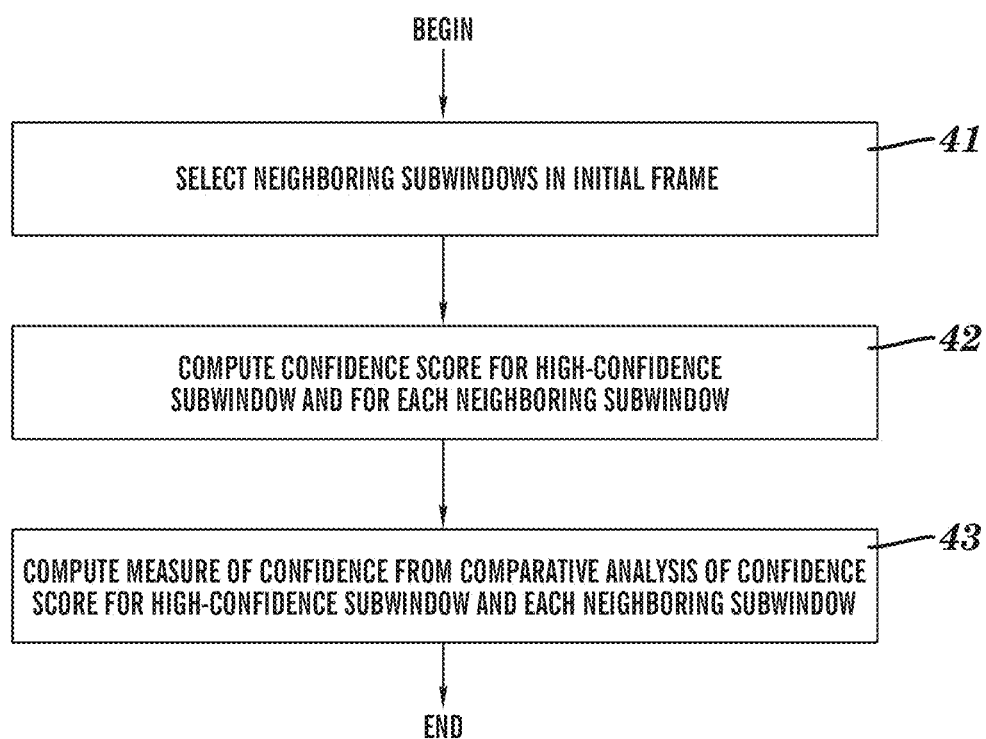
FIGS. 9 and 10 are flow charts describing a method for computing a measure of confidence for a high-confidence subwindow, in accordance with embodiments of the present invention.
Figure 10:
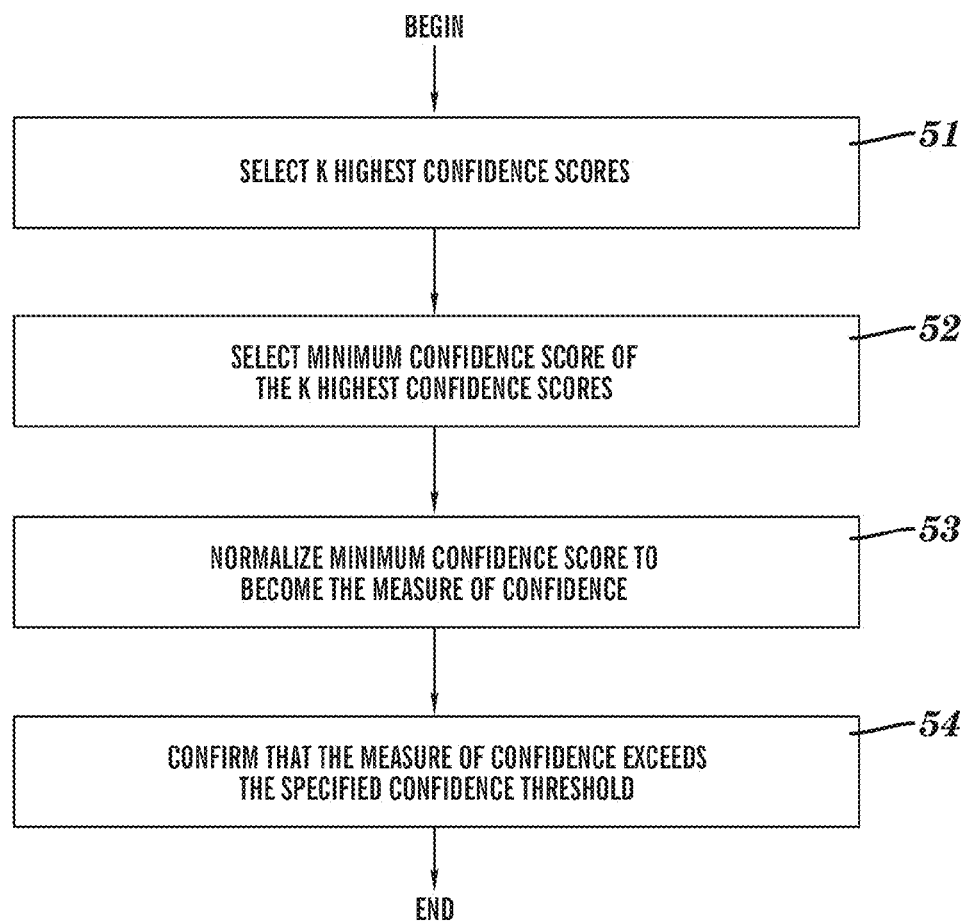

Returning to FIG. 8, detection of the foreground object comprises computing a measure of confidence that the high-confidence subwindow comprises the foreground object and determining that the measure of confidence exceeds a specified confidence threshold. FIGS. 9-10 describe infra the computation of the measure of confidence.

In step 32, the object tracking program 22 tracks the foreground object in respective positive sub-windows of a plurality of subsequent frames (i.e., tracklet illustrated in FIG. 2 described supra) appearing after the initial frame in the sequence of frames, wherein the subsequent frames are within a specified short period of time which is sufficiently short that changes in the background are unlikely over the short period of time. The short period of time is context dependent. For example, if the object is a car, the short period of time may correspond to the distance traveled by the car, moving at the speed limit, being less than 10 feet, 30 feet, etc. In one embodiment, the number of subsequent frames of the tracklet in the specified short period of time may be any number of frames 1 frame and 10 frames, or between 5 frames and 20 frames, etc.

Given a frame and a detection bounding box B1 of the high-confidence subwindow, the object tracking program 22 searches for a bounding box B2 (in a radius around B1) that matches the appearance of the subimage (i.e., subwindow) of the foreground object in the bounding box B1. This process is repeated for each subsequent frame of the tracklet so that the foreground object is "followed". The subwindows in the subsequent frames of the tracklet are "positive" subwindows, by definition, because these subwindows include the foreground object. Section B1, discussed supra, provides additional information pertaining to the use of a tracklet to implement the tracking in step 32.

In one embodiment, the tracked subwindows of the subsequent frames of the tracklet are not subject to the measure of confidence test in which the measure of confidence is computed and determined to exceed the specified confidence threshold.

In one embodiment, the respective subwindows of one or more of the subsequent frames of the tracklet (e.g., all subsequent frames, the first subsequent frame after the initial frame, the last subsequent frame after the initial frame) are subject to the measure of confidence test in which the measure of confidence is computed and determined to exceed the specified confidence threshold.

In step 33, the learning engine 23 receives the positive subwindows tracked in step 32, for use in training the special object detector program 24 to detect the foreground object in the target domain, wherein the positive subwindows include the subwindow of the initial frame and the respective subwindows of the plurality of subsequent frames.

In one embodiment, steps 34 and 35 are performed.

Figure 11:
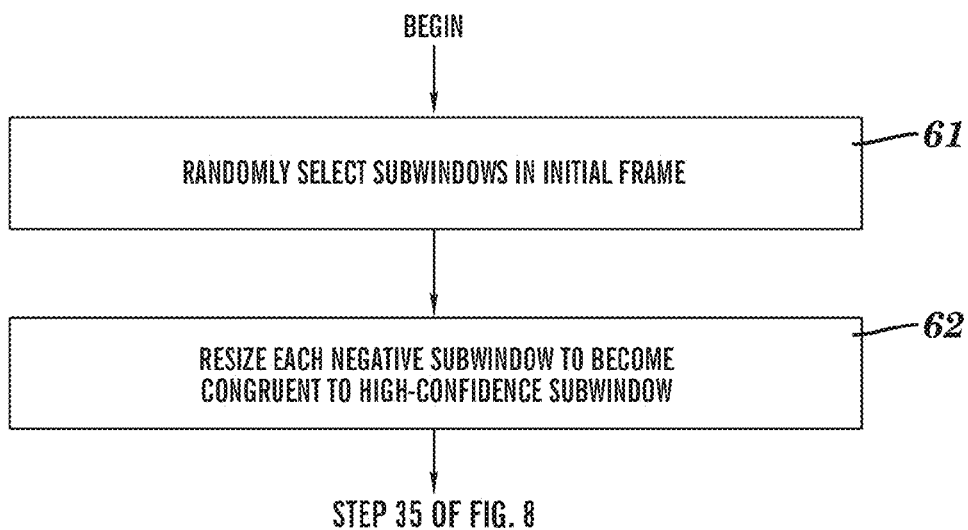
FIGS. 11 and 12 are flow charts describing generation of negative subwindows, in accordance with embodiments of the present invention
Figure 12:
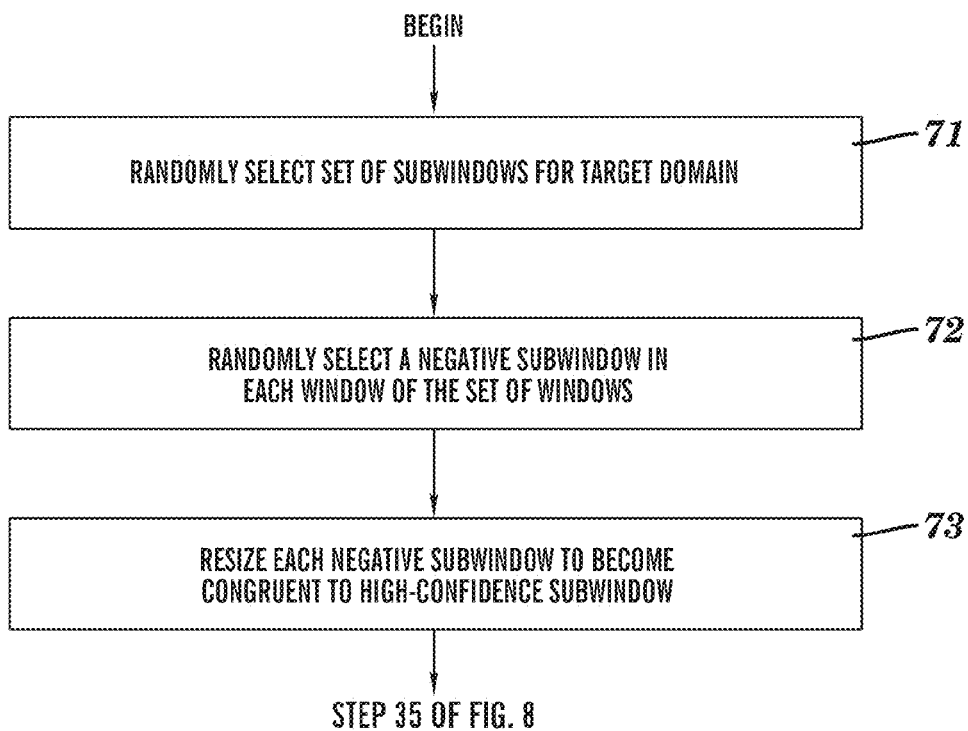

In step 34, the negative subwindow generation program 25 generates negative subwindows with respect to the foreground object, as discussed infra in conjunction with FIGS. 11-12.

In step 35, the learning engine 23 receives the negative subwindows generated in step 34, for use in training the special object detector program 24 to detect the foreground object in the target domain.

In step 36, the learning engine program 23 uses the received positive subwindows, and negative subwindows if received, to train the special object detector program 24 to detect the foreground object in the target domain. Classifiers used for detecting a foreground object, as described supra in Section A, may also be used for training a special object detector by the learning engine program 23. As such, any learning engine known in the art may be used for this training, such as the learning engine described in P. Viola and M. Jones. Robust Real-time Object Detection, *International Journal of Computer Vision*, 2004, 1, 2, 3, 4.

FIGS. 11 and 12, described infra, provide embodiments for generation of negative subwindows.

In step 37 of FIG. 8, the special object detector program 24 detects the foreground object in the target domain after being trained in step 36. In one embodiment, the high-confidence detector program 21 may be transformed into the special object detector program 24 by being trained in accordance with step 36.

In one embodiment, the special object detector program 24 includes a set of brightness thresholds. By being retrained with automatically collected data from the target domain, the special object detector program 24 acquires new brightness thresholds, which leads to more robust detection. For example, the foreground object may be a vehicle moving on an asphalt roadway, which is black and does not have any white crosswalk or roadway markings (e.g., arrows, etc). The vehicle is tracked at different subsequent times subsequent frames, via the object tracking program 22, from a location at which the high-confidence subwindow is determined via the high-confidence detector program 21. When the vehicle is passing over regions of the street which are not as highly contrasted, like a white crosswalk or roadway markings (e.g., arrows etc.), the thresholds are adjusted by retraining the special object detector program 24, via the learning engine program 23, to distinguish the vehicle from the white crosswalk, but not trigger as a foreground object based on the crosswalk alone. The original brightness threshold, prior to retraining the object detector program 24, may lie between the black street and the brighter vehicle, but be below the brightness of the white cross walk. Thus, the brightness threshold is adjusted automatically as a consequence of the retraining of the special object detector program 24, based on the image of the vehicle over the white crosswalk. From the retraining of the special object detector program 24, the brightness threshold is increased so that the brightness threshold will not trigger the foreground object on the white crosswalk alone, but instead trigger the foreground object based on the vehicle.

FIGS. 9 and 10 are flow charts describing a method for computing a measure of confidence for a high-confidence subwindow, in accordance with embodiments of the present invention. FIG. 9, which describes computation of the measure of confidence in step 31 of FIG. 8, includes steps 41-43. FIG. 10, which describes step 43 of FIG. 9 in more detail, includes steps 51-54. The methodology implemented according to FIGS. 9 and 10 is described supra in Section A.

In step 41 of FIG. 9, the high-confidence detector program 21 selects a plurality of neighboring subwindows with respect to the high-confidence subwindow in the initial frame, Each neighboring subwindow partially but not completely overlaps the high-confidence subwindow and the neighboring subwindows differ from each other or one another. In one embodiment, the number (M) of neighboring subwindows may be received as input to the high-confidence detector program 21, but may be changed as described infra in conjunction with step 54 of FIG. 10. The value of M is at least 2.

In one embodiment, the neighboring subwindows are selected randomly (e.g., from a uniform probability distribution). In one embodiment, the random selection of the neighboring subwindows may be subject to a constraint. An example of such a constraint is that each neighboring subwindow must overlap at least a specified percent (e.g., 80%, 90%, etc.) of the area of the high-confidence subwindow.

Figure 15A:
FIG. 15A depicts a high-confidence subwindow in the initial frame, in accordance with embodiments of the present invention.

FIG. 15A depicts a high-confidence subwindow in the initial frame, in accordance with embodiments of the present invention.

Figure 15B:
FIG. 15B depicts a plurality of neighboring subwindows with respect to the high-confidence subwindow of FIG. 15A, in accordance with embodiments of the present invention.

FIG. 15B depicts a plurality of neighboring subwindows with respect to the high-confidence subwindow of FIG. 15A, in accordance with embodiments of the present invention.

In step 42 of FIG. 9, the high-confidence detector program 21 computes a confidence score for the high-confidence subwindow and for each neighboring subwindow. The confidence score utilizes N stage classifiers (N>1) for the foreground object in the high-confidence subwindow and in each neighboring subwindow, respectively.

In step 43, the high-confidence detector program 21 computes the measure of confidence $C(x)$ from comparative analysis of the confidence score for the high-confidence subwindow and for each neighboring subwindow.

FIG. 10, which describes the comparative analysis step 43 of FIG. 9 in more detail, includes steps 51-54.

In step 51, the high-confidence detector program 21 selects K highest confidence scores from a set formed by a union of the confidence score for the high-confidence subwindow and the confidence score for each neighboring subwindow, wherein K is any positive integer in a range of 1 to M+1, and wherein M denotes a total number of neighboring subwindows with respect to the high-confidence subwindow.

In step 52, the high-confidence detector program 21 selects a minimum confidence score of the K confidence scores.

In step 53, the high-confidence detector program 21 normalizes the minimum confidence score to be in a specified range (e.g., a range of 0 to 1), wherein the minimum confidence score becomes the measure of confidence.

In step 54, the high-confidence detector program 21 confirms that the measure of confidence exceeds the specified confidence threshold. If the measure of confidence has been normalized to be in a range from 0 to 1, then in one embodiment, the confidence threshold may be in a range of 0.65 to 0.99 such as, inter alia, 0.65, 0.70, 0.75, 0.80, 0.85, 0.90, 0.95, and 0.99.

In one embodiment, if it is initially determined in step 54 that the measure of confidence does not exceed the specified confidence threshold, then the total number (M) of neighboring subwindows may be iteratively increased (such as, inter alia, by 1 in each iteration), with execution of steps 41-43 of FIG. 9 repeated, to increase the measure of confidence in each successive iteration, until the measure of confidence exceeds the specified confidence threshold in step 54 of FIG. 10.

The following example illustrates the calculation of the measure of confidence. In this example, there are 5 neighboring subwindows X1, X2, X3, X4, X5 (M=5) and 4 classifier stages (N=4). Assume that the 4 stage classifiers $\|fi(X2)\|$ (i=1, 2, 3, 4) for the second neighboring subwindow X2 are:

$\|f1(X2)\|=1.6$ $\|f2(X2)\|=1.5$ $\|f3(X2)\|=1.7$ $\|f4(X2)\|=1.1$

The classifier score δ(x) is determined for a given subwindow x via Equation (2) from the minimum classifier ‖fi(x)‖ and the depth "d" which is the classfier stage corresponding to the minimum classifier. In this example, the weights wd for classifier i are proportional to the stage level and are: w1=0.25, w2=0.50, w3=0.75, and w4=1.0. The minimum classifier for X2 is ‖f4(X2)‖=1.1 at stage level 4, and the respective weight is w4=1.0. Thus, δ(X2)=w4*‖f4(X2)‖=1.0*1.4=1.1

Applying Equation (2) similarly to the high-confidence subwindow X and the 5 neighboring subwindows X1, X2, X3, X4, X5, assume that the results are:

δ(X)=1.4

δ(X1)=0.6

δ(X2)=1.1

δ(X3)=1.2

δ(X4)=0.4

δ(X5)=0.4

Assuming that K=3 in Equation (2), topK=the set of {1.4, 1.2, 1.1}, so that α(X) from Equation (4) is 1.1. Then α(X) is normalized to a specified range of 0 to 1 in this example for calculating C(X). Any applicable method of normalization may be used, such as the Platt scaling of Equation (5). In this example, linear scaling is used. Assuming, in consideration of X and X1-X5, that the range of δ is [0.2, 1.5] and noting that α(X)=1.1, C(x) is normalized from linear scaling as C(X)=(1.1−0.2)/(1.5−0.2)=0.69.

FIGS. 11 and 12 are flow charts describing generation of negative subwindows, in accordance with embodiments of the present invention. A negative subwindow is defined as a subwindow that does not contain any area or volume of the foreground object. FIGS. 11 and 12 each provide a different embodiment of step 34 of FIG. 8 for generating the negative subwindows.

FIG. 11 includes steps 61-62 which represent step 34 of FIG. 8 in one embodiment.

In step 61, the negative subwindow generation program 25 randomly selects (e.g., from a uniform probability distribution) a plurality of negative subwindows in the initial frame. Each negative subwindow of the plurality of negative subwindows has a total area exceeding a total area of the high-confidence subwindow. Each negative subwindow of the plurality of negative subwindows is located less than a specified distance threshold from the high-confidence subwindow. Each negative subwindow of the plurality of negative subwindows may touch or be displaced from the high-confidence subwindow. Each negative subwindow of the plurality of negative subwindows does not include the foreground object.

In step 62, the negative subwindow generation program 25 resizes each negative subwindows of the plurality of negative subwindows to become congruent to the high-confidence subwindow. Definitionally, any two subwindows are congruent if the two subwindows have the same shape and size and thus coincide when placed on each other.

After step 62 is executed, program control branches to step 35 of FIG. 8 to feed the plurality of negative subwindows to the learning engine for use, along with the positive subwindows, in training the special object detector to detect the foreground object in the target domain.

FIG. 12 includes steps 71-73 which represent step 34 of FIG. 8 in one embodiment.

In step 71, the negative subwindow generation program 25 randomly selects (e.g., from a uniform probability distribution) a set of windows pertaining to the target domain.

In step 72, the negative subwindow generation program 25 randomly selects (e.g., from a uniform probability distribution) a negative subwindow in each window of the set of windows. The negative subwindow in each window of the set of windows has an aspect ratio differing from the aspect ratio of the high-confidence subwindow. The negative subwindow in each window of the set of windows does not include the foreground object.

In step 73, the negative subwindow generation program 25 resizes the negative subwindow in each window of the set of windows to become congruent to the high-confidence subwindow.

After step 73 is executed, program control branches to step 35 of FIG. 8 to feed the plurality of negative subwindows to the learning engine for use, along with the positive subwindows, in training the special object detector to detect the foreground object in the target domain.

For execution of the method of FIG. 8, either or both of the embodiments of FIGS. 11 and 12 may be performed to feed negative subwindows to the learning engine in step 35 of FIG. 8.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for training a special object detector to distinguish a foreground object appearing in a sequence of frames for a target domain, the sequence of frames depicting motion of the foreground object in a non-uniform background, each frame in the sequence before a last frame in the sequence corresponding to a time earlier than a time to which an immediately next frame in the sequence corresponds, the method comprising:

one or more processors of a computer system detecting the foreground object in a high-confidence subwindow of an initial frame of the sequence, wherein the detecting the foreground object comprises computing a measure of confidence that the high-confidence subwindow comprises the foreground object and determining that the measure of confidence exceeds a specified confidence threshold;

the one or more processors tracking the foreground object in respective positive subwindows of a plurality of subsequent frames appearing after the initial frame in the sequence of frames, wherein the subsequent frames are within a specified short period of time;

the one or more processors feeding the positive subwindows to a learning engine for use in training the special object detector to detect the foreground object in the target domain, wherein the positive subwindows include the subwindow of the initial frame and the respective subwindows of the plurality of subsequent frames, wherein the method further comprises:

the one or more processors randomly selecting a negative subwindow in each window of a set of windows pertaining to the target domain, wherein the negative subwindow in each window of the set of windows has an aspect ratio differing from the aspect ratio of the high-confidence subwindow, and wherein the negative subwindow in each window of the set of windows does not include the foreground object; and the one or more processors resizing the negative subwindow in each window of the set of windows to become congruent to the high-confidence subwindow.

2. The method of claim 1, wherein the method further comprises:

the one or more processors randomly selecting the set of windows; and the one or more processors feeding the negative subwindow in each window of the set of windows to the learning engine for use, along with the positive subwindows, in training the special object detector to detect the foreground object in the target domain.

3. The method of claim 1, wherein the computing the measure of confidence comprises:

selecting a plurality of neighboring subwindows with respect to the high-confidence subwindow in the initial frame, wherein each neighboring subwindow partially but not completely overlaps the high-confidence subwindow, and wherein the neighboring subwindows differ from one another;

computing a confidence score for the high-confidence subwindow and for each neighboring subwindow, wherein the confidence score stage classifiers for the foreground object in the high-confidence subwindow and in each neighboring subwindow; and computing the measure of confidence from comparative analysis of the confidence score for the high-confidence subwindow and each neighboring subwindow.

4. The method of claim 3, wherein the determining that the measure of confidence exceeds the specified confidence threshold comprises initially determining that the measure of confidence does not exceed the specified confidence threshold, followed by iteratively performing the selecting a plurality of neighboring subwindows, the computing a confidence score, and the computing the measure of confidence, wherein the total number of neighboring subwindows of the plurality of neighboring subwindows is increased in each iteration, until determining that the measure of confidence exceeds the specified confidence threshold.

5. The method of claim 3, wherein the computing the measure of confidence from comparative analysis comprises:

selecting K highest confidence scores from a set formed by a union of the confidence score for the high-confidence subwindow and the confidence score for each neighboring subwindow, wherein K is in a range of 1 to M+1, and wherein M denotes a total number of neighboring subwindows with respect to the high-confidence subwindow;

selecting a minimum confidence score of the K confidence scores;

normalizing the minimum confidence score to be in a specified range, wherein the minimum confidence score becomes the measure of confidence; and confirming that the measure of confidence exceeds the specified confidence threshold.

6. The method of claim 5, wherein K is in a range of 2 to M.

7. The method of claim 3, wherein the area of each neighboring subwindow overlaps the area of each high-confidence subwindow by at least a specified percent.

8. A computer program product for training a special object detector to distinguish a foreground object appearing in a sequence of frames for a target domain, the sequence of frames depicting motion of the foreground object in a non-uniform background of the sequence, each frame in the sequence before a last frame in the sequence corresponding to a time earlier than a time to which an immediately next frame in the sequence corresponds, the computer program product comprising:

a computer readable hardware storage device that is not a signal or a medium/wave;

first program instructions to detect the foreground object in a high-confidence subwindow of an initial frame of the sequence, wherein to detect the foreground object comprises to compute a measure of confidence that the high-confidence subwindow comprises the foreground object and to determine that the measure of confidence exceeds a specified confidence threshold;

second program instructions to track the foreground object in respective positive subwindows of a plurality of subsequent frames appearing after the initial frame in the sequence of frames, wherein the subsequent frames are within a specified short period of time; and third program instructions to feed the positive subwindows to a learning engine for use in training the special object detector to detect the foreground object in the target domain, wherein the positive subwindows include the subwindow of the initial frame and the respective subwindows of the plurality of subsequent frames, wherein the computer program product further comprises:

fourth program instructions to randomly select a negative subwindow in each window of a set of windows pertaining to the target domain, wherein the negative subwindow in each window of the set of windows has an aspect ratio differing from the aspect ratio of the high-confidence subwindow, and wherein the negative subwindow in each window of the set of windows does not include the foreground object; and fifth program instructions to resize the negative subwindow in each window of the set of windows to become congruent to the high-confidence subwindow, and wherein the first program instruction, the second program instructions, the third program instructions, the fourth program instructions, and the fifth program instructions are stored on the computer readable hardware storage device for execution by one or more processors of a computer system.

9. The computer program product of claim 8, wherein the method further comprises:

sixth program instructions to randomly select the set of windows; and seventh program instructions to feed the negative subwindow in each window of the set of windows to the learning engine for use, along with the positive subwindows, in training the special object detector to detect the foreground object in the target domain, wherein the sixth program instructions and the seventh program instructions are stored on the computer readable hardware storage device for execution by the one or more processors.

10. The computer program product of claim 8, wherein to compute the measure of confidence comprises:

to select a plurality of neighboring subwindows with respect to the high-confidence subwindow in the initial frame, wherein each neighboring subwindow partially but not completely overlaps the high-confidence subwindow, and wherein the neighboring subwindows differ from one another;

to compute a confidence score for the high-confidence subwindow and for each neighboring subwindow, wherein the confidence score stage classifiers for the foreground object in the high-confidence subwindow and in each neighboring subwindow; and to compute the measure of confidence from comparative analysis of the confidence score for the high-confidence subwindow and each neighboring subwindow.

11. The computer program product of claim 10, wherein to determine that the measure of confidence exceeds the specified confidence threshold comprises to initially determine that the measure of confidence does not exceed the specified confidence threshold, followed by to iteratively perform: the to select a plurality of neighboring subwindows, the to compute a confidence score, and the to compute the measure of confidence, wherein the total number of neighboring subwindows of the plurality of neighboring subwindows is increased in each iteration, until it is determined that the measure of confidence exceeds the specified confidence threshold.

12. The computer program product of claim 10, wherein to compute the measure of confidence from comparative analysis comprises:
  to select K highest confidence scores from a set formed by a union of the confidence score for the high-confidence subwindow and the confidence score for each neighboring subwindow, wherein K is in a range of 1 to M+1, and wherein M denotes a total number of neighboring subwindows with respect to the high-confidence subwindow;
  to select a minimum confidence score of the K confidence scores;
  to normalize the minimum confidence score to be in a specified range, wherein the minimum confidence score becomes the measure of confidence; and
  to confirm that the measure of confidence exceeds the specified confidence threshold.

13. A computer system for training a special object detector to distinguish a foreground object appearing in a sequence of frames for a target domain, the sequence of frames depicting motion of the foreground object in a non-uniform background, each frame in the sequence before a last frame in the sequence corresponding to a time earlier than a time to which an immediately next frame in the sequence corresponds, the computer system comprising:
  one or more processors;
  a computer readable memory;
  a computer readable storage device;
  first program instructions to detect the foreground object in a high-confidence subwindow of an initial frame of the sequence, wherein to detect the foreground object comprises to compute a measure of confidence that the high-confidence subwindow comprises the foreground object and to determine that the measure of confidence exceeds a specified confidence threshold;
  second program instructions to track the foreground object in respective positive subwindows of a plurality of subsequent frames appearing after the initial frame in the sequence of frames, wherein the subsequent frames are within a specified short period of time; and
  third program instructions to feed the positive subwindows to a learning engine for use in training the special object detector to detect the foreground object in the target domain, wherein the positive subwindows include the subwindow of the initial frame and the respective subwindows of the plurality of subsequent frames,
  wherein the computer program system further comprises:
    fourth program instructions to randomly select a negative subwindow in each window of a set of windows pertaining to the target domain, wherein the negative subwindow in each window of the set of windows has an aspect ratio differing from the aspect ratio of the high-confidence subwindow, and wherein the negative subwindow in each window of the set of windows does not include the foreground object; and
    fifth program instructions to resize the negative subwindow in each window of the set of windows to become congruent to the high-confidence subwindow, and
  wherein the first program instruction, the second program instructions, the third program instructions, the fourth program instructions, and the fifth program instructions are stored on the computer readable computer readable storage device for execution by one or more processors via the computer readable memory.

14. The computer system of claim 13, wherein the method further comprises:
  sixth program instructions to randomly select the set of windows; and;
  seventh program instructions to feed the negative subwindow in each window of the set of windows to the learning engine for use, along with the positive subwindows, in training the special object detector to detect the foreground object in the target domain,
  wherein, the sixth program instructions and the seventh program instructions are stored on the computer readable computer readable storage device for execution by the one or more processors via the computer readable memory.

15. The computer system of claim 13, wherein to compute the measure of confidence comprises:
  to select a plurality of neighboring subwindows with respect to the high-confidence subwindow in the initial frame, wherein each neighboring subwindow partially but not completely overlaps the high-confidence subwindow, and wherein the neighboring subwindows differ from one another;
  to compute a confidence score for the high-confidence subwindow and for each neighboring subwindow, wherein the confidence score stage classifiers for the foreground object in the high-confidence subwindow and in each neighboring subwindow; and
  to compute the measure of confidence from comparative analysis of the confidence score for the high-confidence subwindow and each neighboring subwindow.

16. The computer system of claim 15, wherein to determine that the measure of confidence exceeds the specified confidence threshold comprises to initially determine that the measure of confidence does not exceed the specified confidence threshold, followed by to iteratively perform: the to select a plurality of neighboring subwindows, the to compute a confidence score, and the to compute the measure of confidence, wherein the total number of neighboring subwindows of the plurality of neighboring subwindows is increased in each iteration, until it is determined that the measure of confidence exceeds the specified confidence threshold.

17. The computer system of claim 15, wherein to compute the measure of confidence from comparative analysis comprises:
  to select K highest confidence scores from a set formed by a union of the confidence score for the high-confidence subwindow and the confidence score for each neighboring subwindow, wherein K is in a range of 1 to M+1, and wherein M denotes a total number of neighboring subwindows with respect to the high-confidence subwindow;
  to select a minimum confidence score of the K confidence scores;
  to normalize the minimum confidence score to be in a specified range, wherein the minimum confidence score becomes the measure of confidence; and to confirm that the measure of confidence exceeds the specified confidence threshold.

* * * * *